J. McMULLEN.
SAFETY DEVICE FOR BRAKE BEAMS AND THE LIKE.
APPLICATION FILED OCT. 9, 1916.
1,338,317. Patented Apr. 27, 1920.
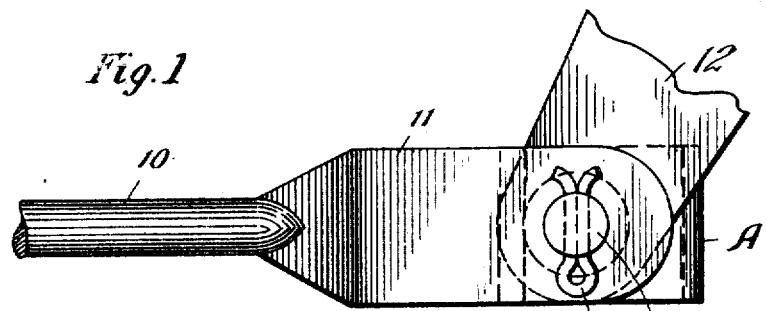
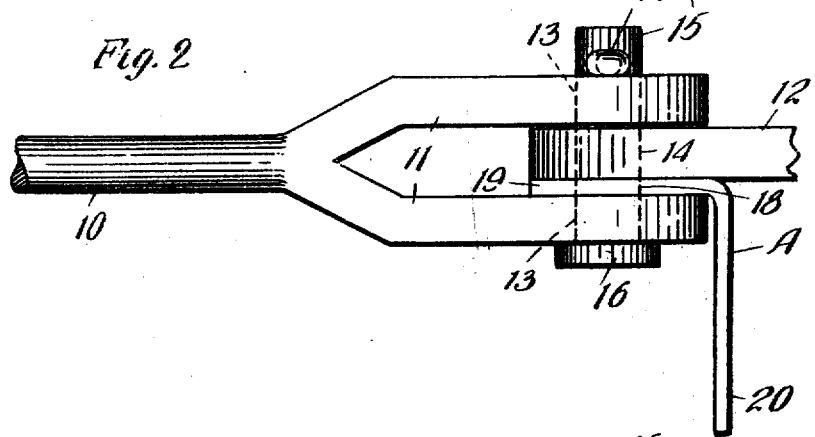
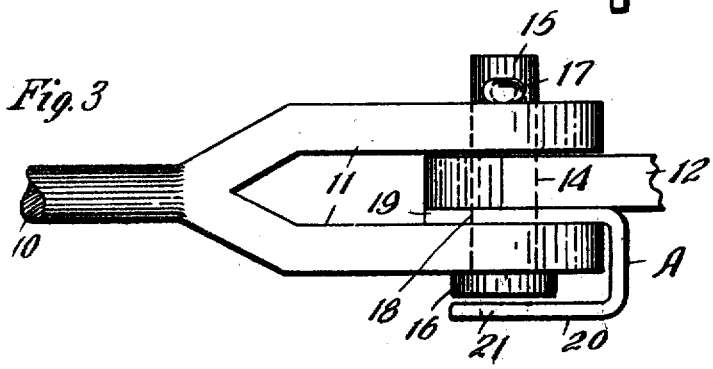
WITNESSES:
INVENTOR.
John McMullen
BY George L Haight
his ATTORNEY

UNITED STATES PATENT OFFICE.

JOHN McMULLEN, OF BUFFALO, NEW YORK.

SAFETY DEVICE FOR BRAKE-BEAMS AND THE LIKE.

1,338,317.

Specification of Letters Patent.

Patented Apr. 27, 1920.

Application filed October 9, 1916. Serial No. 124,665.

*To all whom it may concern:*

Be it known that I, JOHN McMULLEN, a citizen of the United States, residing at Buffalo, in the county of Erie and State of New York, have invented a certain new and useful Improvement in Safety Devices for Brake-Beams and the like, of which the following is a full, clear, concise, and exact description, reference being had to the accompanying drawings, forming a part of this specification.

This invention relates to improvements in safety devices for brake beams and the like.

In the operation of railway trains, it has been found that many wrecks and derailments have been due to the brake beams dropping on the rail after the hanger pins have worked out, due to the fact that the cotters employed to retain the hanger pins in position, have been destroyed by the constant vibration and movement of the parts. Not only have accidents been due to the dropping of brake beams but, to a probably less degree, also to the failure of other parts of the truck and its appurtenances giving way caused by similar accidental falling out of connecting pins.

The object of my invention is to provide a safety device of simple and cheap construction which can be applied to equipment now in service without necessitating any changes in construction and which will overcome the difficulties heretofore experienced and positively retain the connecting pins in position. The invention also contemplates the provision of a safety device having the characteristics above indicated, which can be easily applied by unskilled labor merely by employing a hammer or other suitable, simple tool.

In the drawing forming a part of this specification, Figure 1 is a top plan view of portions of a connector and brake beam hanger, showing my improvements in connection therewith. Fig. 2 is a side elevation of the structure illustrated in Fig. 1 and showing the safety clip as it is first applied. And Fig. 3 is a view similar to Fig. 2, showing the safety device in its final condition.

In said drawing, 10 denotes a connecting rod or lever having forked ends 11—11 between which is received the end 12 of a hanger for brake beams. The forked ends 11 are perforated, as indicated at 13—13 and the end 12 is similarly perforated, as indicated at 14, to thereby receive the connecting pin 15, the same having a headed end 16. It has heretofore been customary to rely upon a cotter such as shown at 17, for retaining the pin 15 in position, but experience has proven that the cotter pin is soon worn off or destroyed, due to the constant vibration and movement of the parts.

In order to positively insure the retaining of the pin 15 in position and thereby eliminate accidents, I have provided an improved safety device designated generally by the reference A. Said device, as shown, comprises a plate of preferably sheet material adapted to be bent and is preferably first formed of right angle shape, as shown in Fig. 2. The plate is provided with a perforation 18 through which is adapted to extend the pin 15. The device A is applied as shown in Fig. 2, that is, with the end or arm 19 having the perforation 18 therein located between the end 12 and the fork 11 adjacent the headed end of the pin. The other arm 20 of the safety device is then bent by means of a hammer or other suitable tool to the position shown at 21 in Fig. 3, that is, adjacent to and directly over the headed end of the pin. By this arrangement, the pin is positively prevented from coming out since it is limited in its axial movement by the bent-over end 21 of the safety device.

The improved device can be applied to equipment now in service, since there is always provided sufficient looseness or clearance between the forked ends of the connectors and hangers to admit of the insertion of the safety device therebetween, and obviously the improvement can be applied to new equipment with equal facility. The device can be made very cheaply by cutting and punching the same from sheet material; it can be applied by unskilled labor with the simplest of tools; and cannot accidentally be displaced, since, no matter what position the safety clip assumes, the end 21 thereof will always be positioned over the head of the pin by which it is supported.

I have herewith described my improvement as applied more particularly to the connections for brake beam hangers, but, as will be understood by those skilled in the art, the improvement is susceptible of use in a great variety of places such as for connecting cylinder lever connections, floating lever connections, top lever connections, hand brake connections, truck lever connections and all connections wherein one member is pivotally connected thereto between the forks.

I claim:

1. In a device of the character described, the combination with a member having a forked end, a second member having one end located within said forked end, all of said ends being perforated, and a headed pin extending through said perforations, of a retainer for said pin comprising a plate of susbtantially U shape, one arm of said plate being perforated and located between the end of the second named member and the fork of the first named member, the other arm of said plate being disposed over and adjacent the headed end of the pin.

2. In a device of the character described, the combination with two members having alined perforations and a pin extending through said perforations for pivotally connecting said members, of a retainer for said pin comprising a plate having two arms, one of said arms being perforated and disposed between said members, said pin extending through the perforation of said arm, the other arm of said retainer being extended over one of said members and disposed over the adjacent end of said pin.

In witness that I claim the foregoing I have hereunto subscribed my name this 5th day of October, 1916.

JOHN McMULLEN.

Witnesses:
J. M. GROFF,
ELIZABETH M. BRITT.